(12) United States Patent
Tsuchiya

(10) Patent No.: US 6,262,966 B1
(45) Date of Patent: Jul. 17, 2001

(54) RECORDING MEDIUM AND OPTICAL PICKUP DEVICE

(75) Inventor: Yoichi Tsuchiya, Hashima (JP)

(73) Assignee: Sanyo Electric Co., Ltd., Osaka (JP)

(*) Notice: Subject to any disclaimer, the term of this patent is extended or adjusted under 35 U.S.C. 154(b) by 0 days.

(21) Appl. No.: 09/403,370

(22) PCT Filed: Apr. 23, 1998

(86) PCT No.: PCT/JP98/01894

§ 371 Date: Oct. 21, 1999

§ 102(e) Date: Oct. 21, 1999

(87) PCT Pub. No.: WO98/49680

PCT Pub. Date: Nov. 5, 1998

(30) Foreign Application Priority Data

Apr. 25, 1997 (JP) .................................................. 9-109432

(51) Int. Cl.$^7$ .................................................. G11B 7/24
(52) U.S. Cl. .................................... 369/275.4; 369/275.3
(58) Field of Search .......................... 369/275.1, 275.2, 369/275.3, 275.4, 112, 116, 44.37, 44.26, 32

(56) References Cited

U.S. PATENT DOCUMENTS

| 5,422,874 | 6/1995 | Birukawa et al. ............. 369/275.2 |
| 5,477,527 | 12/1995 | Tsuchiya et al. ............. 369/275.4 |
| 5,659,534 | * 8/1997 | Terasaki et al. ............. 369/116 |
| 5,673,250 | * 9/1997 | Mieda et al. ............. 369/275.4 |
| 5,828,648 | * 10/1998 | Takasu et al. ............. 369/275.1 |
| 5,905,699 | * 5/1999 | Ishibashi ............. 369/44.26 |

FOREIGN PATENT DOCUMENTS

| 0 553 541 | 8/1993 | (EP) . |
| 8-87747 | 4/1996 | (JP) . |
| 9-147421 | 6/1997 | (JP) . |

OTHER PUBLICATIONS

Patent Abstracts of Japan; vol. 1996, No. 11, Nov. 29, 1996 & JP 08 180492 A (Sharp Corp), Jul. 12, 1996 *abstract*.

* cited by examiner

Primary Examiner—Thang V. Tran
Assistant Examiner—Kim-Kwok Chu
(74) Attorney, Agent, or Firm—Armstrong, Westerman, Hattori, McLeland & Naughton, LLP

(57) ABSTRACT

In a double density CD for an optical pickup device including a laser with a wavelength of $\lambda \mu m$ and an objective lens (4) with a numerical aperture of NA, the expression $0.7<TP/(\lambda/NA)<0.8$, where TP is a track pitch in $\mu m$ and/or the expression $0.40<L/(\lambda/NA)<0.45$, where L is a minimum pit length in $\mu m$ are/is satisfied. Thus, jitter is suppressed and the reproduction characteristic is improved.

4 Claims, 5 Drawing Sheets

RECORDING MEDIUM AND OPTICAL PICKUP DEVICE

TECHNICAL FIELD

The present invention relates generally to a recording medium and an optical pickup device, and more particularly to a recording medium having a recording density twice a recording density of a compact disk and an optical pickup device reproducing information from the recording medium.

BACKGROUND ART

Optical disks, such as CD-ROM (Compact Disk-Read Only Memory), from which information can be read by semiconductor lasers and about 1.2 mm in thickness, have been available. For the reproduction of information from such an optical disk, a focusing servo control and a tracking servo control are performed on an objective lens and a pit string on a signal recording surface are irradiated with laser beams in an optical pickup device. Recently, higher densification has been achieved for recording animation lasting for a long time period.

For example, a DVD (Digital Video Disk) standard has been proposed. According to this standard, a DVD is formed as an optical disk recording information of 4.7 G bytes per one surface and having the same diameter with a CD-ROM, that is, 12 cm. By joining DVDs together back to back, each 0.6 mm in thickness, information of 9.4 G bytes can be recorded on one optical disk. Further, a double density CD that has a recording density twice the recording density of a CD and a CD-α that has a recording density three times the recording density of the CD are under development. Still further, an LD (Laser Disk) and a MUSE-LD (Multiple Sub-Nyquist Sampling Encoding-Laser Disk) recording a MUSE signal have been proposed.

Among these various optical disks, double density CDs, that are of the same diameter and thickness as CDs and hence attract attention as optical disks satisfying the requirement of high densification and requirements of players at the same time, are expected to be utilized as optical disks for karaoke or games, for example. If the double density CDs are to be employed as such, it is desirable to achieve high densification while maintaining the thickness of the double density CD same with CDs, that is 1.2 mm, to ensure the compatibility with the existing optical disks.

In the variety of currently available optical disks, various values are employed for a wavelength of a semiconductor laser employed in an optical pickup device, a numerical aperture of an objective lens, a track pitch and a minimum pit length of the recording medium. In the double density CD, the optimization of reproduction characteristic has not been considered in view of an actual setting of values such as the wavelength of the semiconductor laser, the numerical aperture of the objective lens, the track pitch, and the minimum pit length.

Hence, an object of the present invention is to provide a recording medium having favorable reproduction characteristics and an optical pickup device for the same.

DISCLOSURE OF THE INVENTION

According to one aspect of the present invention, a recording medium for an optical pickup device having a laser with a wavelength of $\lambda \mu m$ and an objective lens with a numerical aperture of NA includes a track with TP $\mu m$ pitch where the expression $0.7<TP/(\lambda/NA)<0.8$ is satisfied.

On the other hand, an optical pickup device for a recording medium having a track with TP $\mu m$ pitch includes a laser and an objective lens. The laser has a wavelength of $\lambda \mu m$. The objective lens focuses beams from the laser and has a numerical aperture of NA where the expression $0.7<TP/(\lambda/NA)<0.8$ is satisfied.

Because of the above relation of wavelength $\lambda \mu m$ of the laser, the numerical aperture NA of the objective lens, and the track pitch TP $\mu m$, crosstalk and jitter can be suppressed and a tracking error signal at a sufficient level can be obtained. Thus, the reproduction characteristics are improved.

According to another aspect of the present invention, a recording medium for an optical pickup device having a laser with a wavelength of $\lambda \mu m$ and an objective lens having a numerical aperture of NA, has a track having a minimum pit length L $\mu m$, wherein an expression $0.40<L/(\lambda/NA)<0.45$ is satisfied.

On the other hand, an optical pickup device for a recording medium having a track with a minimum pit length L $\mu m$ includes a laser and an objective lens. The laser has a wavelength of $\lambda \mu m$. The objective lens focuses a beam from the laser and has a numerical aperture of NA, where an expression $0.40<L/(\lambda/NA)<0.45$ is satisfied.

Because of the above described relation of the minimum pit length L $\mu m$, the wavelength $\lambda \mu m$ of the laser, and the numerical aperture NA of the objective lens, jitter can be suppressed and a sufficient modulation ratio can be obtained. Thus, the reproduction characteristics are improved.

In addition, as far as track pitch TP $\mu m$ satisfies the relation $0.7<TP/(\lambda/NA)<0.8$ or the minimum pit length L pm satisfies the relation $0.40<L/(\lambda/NA)<0.45$, various semiconductor lasers and objective lenses can be employed. As a result, the design of the optical pickup device is facilitated.

BEST MODES FOR CARRYING OUT THE INVENTION

Figure 1:
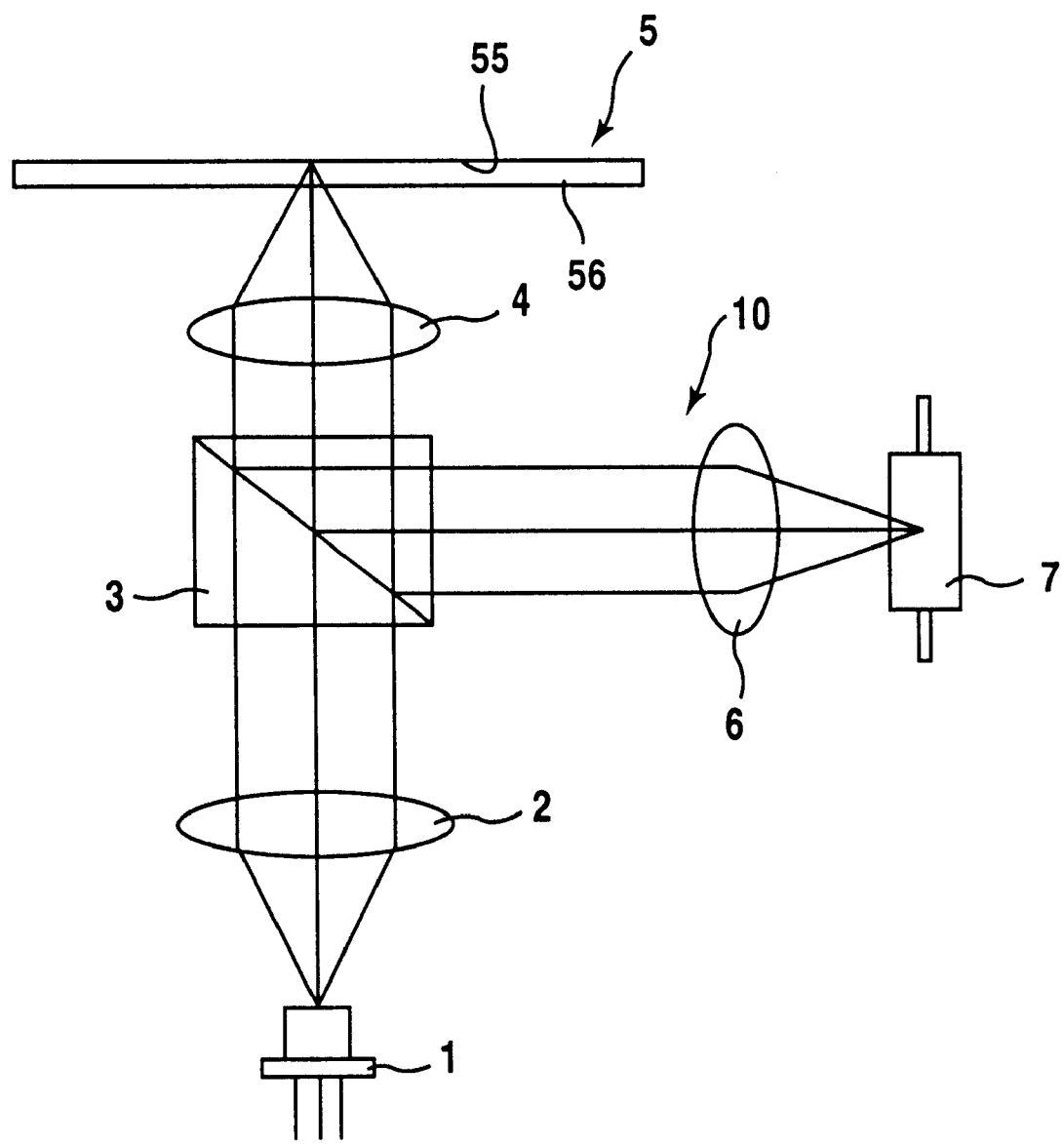
FIG. 1 shows a structure of an optical pickup device according to the embodiment of the present invention.

The preferred embodiments of the present invention will be described with reference to the drawings. In the drawings, the same reference character will represent the same or a similar part and the description thereof will not be repeated.

First, an optical disk and an optical pick up device that are common to first to third embodiments described later will be described.

With reference to FIG. 1, an optical pickup device 10 according to the embodiments of the present invention for reproducing a signal from a double density CD 5 having a recording density twice a recording density of a CD includes a semiconductor laser 1, a collimator lens 2, a half mirror (or polarizing beam splitter) 3, an objective lens 4, a condenser lens 6 and an photodetector 7.

Semiconductor laser 1 generates laser beams with a wavelength of $\lambda \mu$m. Collimator lens 2 makes laser beams of $\lambda \mu$m wavelength parallel to each other. Half mirror 3 passes the laser beams from collimator lens 2 straight and reflects laser beams reflected back from double density CD 5 in a direction of photodetector 7 in a right angle. Objective lens 4 has numerical aperture of NA and focuses the laser beams transmitted through half mirror 3 on a signal recording surface 55 of double density CD 5. Condenser lens 6 condenses laser beams reflected from half mirror 3 onto photodetector 7. Photodetector 7 detects the laser beams from condenser lens 6 and generates a reproduced signal, a focusing error signal, a tracking error signal and so on according thereto.

In optical pickup device 10 having the structure as described above, the laser beams generated by semiconductor laser 1 are incident on objective lens 4 after being made parallel to each other by collimator lens 2 and passing through half mirror 3. The laser beams incident on objective lens 4 are focused by objective lens 4 and hit on signal recording surface 55 after passing through a transparent substrate 56 of double density CD 5. After reflected by signal recording surface 55, the laser beams travel through objective lens 4 and return to half mirror 3. A half of the laser beams are reflected in a direction forming 90° with a direction of incidence and condensed on photodetector 7 by condenser lens 6. In photodetector 7, strength of laser beams reflected from signal recording surface 55 is detected, and the reproduced signal, the focusing error signal, the tracking error signal and so on are generated according to the detected strength.

Figure 2:
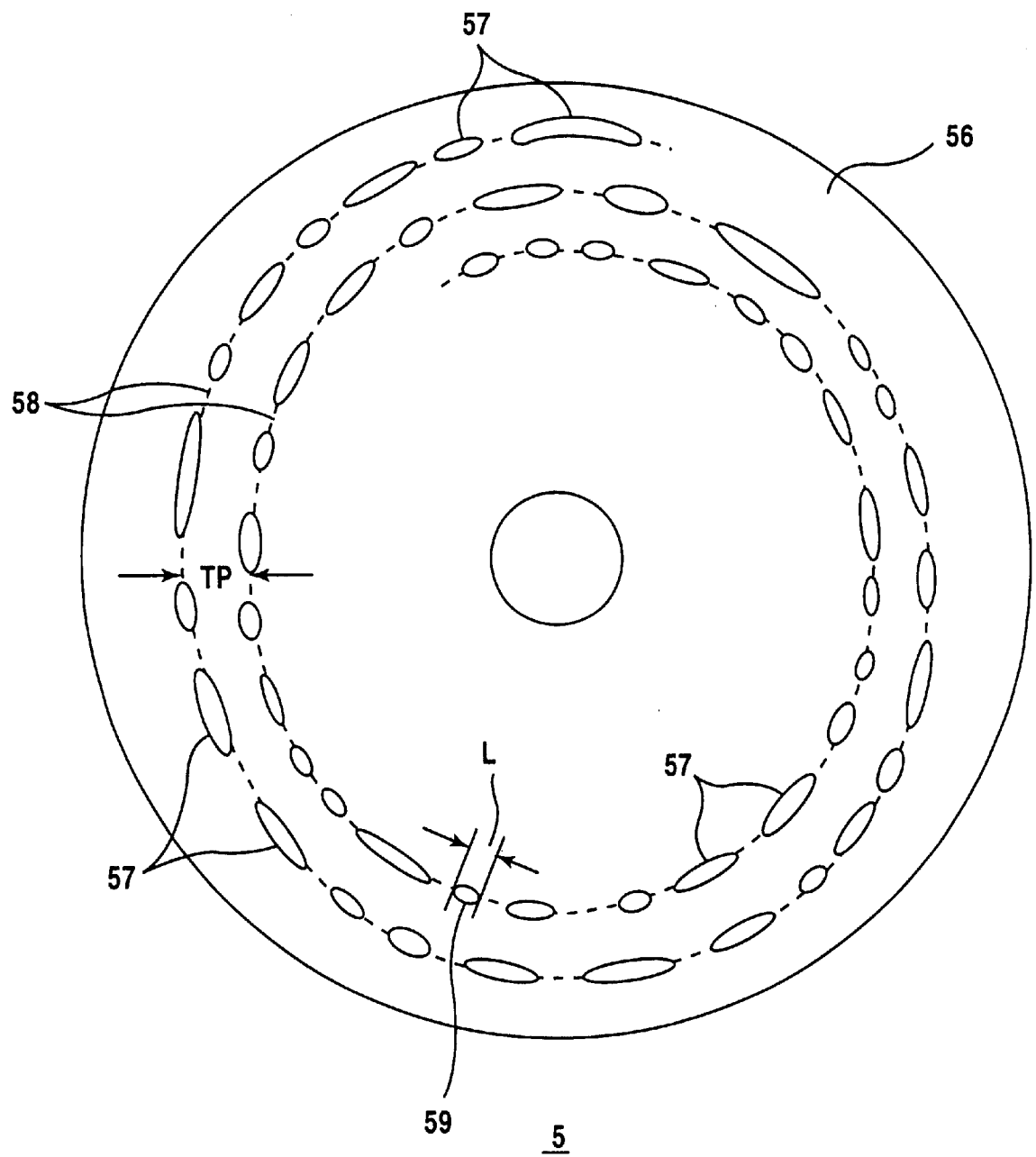
FIG. 2 is a plan view showing a structure of an optical disk according to the embodiment of the present invention.

On the other hand, double density CD 5 has a circular transparent substrate 56 formed of polycarbonate resin or the like as shown in FIG. 2. On a main surface of transparent substrate 56, a plurality of pits 57 are formed in a shape of a spiral. This string of pits 57 forms a track 58. In this case, one track 58 is formed in a spiral shape. An interval between adjacent tracks 58 is called a track pitch. Track pitch of track 58 is TP $\mu$m. Here, as an original recorded signal is modulated in an EFM method and pit 57 is formed according to the modulated signal, the length of pit 57 is not uniform. When the original recorded signal is encoded by 3T-11T RLL method, three-bit pit 59 is the shortest among pits 57. Such a length of pit 59 is referred to as minimum pit length. Here, the minimum pit length of track 58 is represented as L $\mu$m.

In first to third embodiments described later, track pitch TP and minimum pit length L are determined such that recording density becomes twice as high as the recording density of CD. Based on thus determined track pitch TP and minimum pit length L, a wavelength of semiconductor laser 1 and a numerical aperture of objective lens 4 suitable for reproduction from double density CD 5 are determined.

First Embodiment

Table 1 shows the wavelength $\lambda$ ($\mu$m) of semiconductor laser 1, numerical aperture NA of objective lens 4, $\lambda$/NA, track pitch TP, and TP/($\lambda$/NA) in the first embodiment. Besides the parameters described above employed for reproduction from double density CD 5, parameters employed for reproduction from a CD, an LD, a MUSE-LD, a CD-alpha, and a DVD are shown for comparison.

TABLE 1

| | Wavelength of semiconductor laser: $\lambda$ ($\mu$m) | Numerical aperture of objective lens: NA | $\lambda$/NA | Track pitch: TP ($\mu$m) | TP/($\lambda$/NA) |
|---|---|---|---|---|---|
| CD | 0.780 | 0.45 | 1.73 | 1.6 | 0.925 |
| LD | 0.780 | 0.50 | 1.56 | 1.6 | 1.026 |
| MUSE-LD | 0.670 | 0.55 | 1.218 | 1.1 | 0.90 |
| | 0.685 | 0.55 | 1.245 | 1.1 | 0.88 |
| CD-α | 0.685 | 0.55 | 1.245 | 1.0 | 0.80 |
| | 0.670 | 0.55 | 1.218 | 1.0 | 0.82 |
| DVD | 0.635 | 0.60 | 1.058 | 0.74 | 0.6992 |
| | 0.650 | 0.60 | 1.083 | 0.74 | 0.683 |
| Double density CD | 0.780 | 0.52 | 1.50 | 1.1 | 0.73 |

As shown in Table 1, for the reproduction from the CD, a semiconductor laser with a wavelength of 0.780 $\mu$m (780 nm) and an objective lens having 0.45 numerical aperture are employed and track pitch TP is set to 1.6 $\mu$m. In this case, $\lambda$/NA is 1.73 and TP/($\lambda$/NA) is 0.925. The track pitch of the CD is shown in a table in 'Electronic Engineering', Vol.38, No.8, 1996, p.53, Nikkan Kogyo Shinbun Co., for example.

For the reproduction from the LD, a semiconductor laser with a wavelength of 0.780 $\mu$m and an objective lens having 0.50 numerical aperture are employed and track pitch TP is set to 1.6 $\mu$m. In this case, $\lambda$/NA is 1.56 and TP/($\lambda$/NA) is 1.026.

For the reproduction from the MUSE-LD, a semiconductor laser with a wavelength of 0.670 $\mu$m or 0.685 $\mu$m and an objective lens having 0.55 numerical aperture are employed and track pitch TP is set to 1.1 $\mu$m. When the wavelength of the semiconductor laser is 0.670 $\mu$m, $\lambda$/NA is 1.218 and TP/($\lambda$/NA) is 0.90. When the wavelength of the semiconductor laser is 0.685 $\mu$m, $\lambda$/NA is 1.245 and TP/($\lambda$/NA) is 0.88.

For the reproduction from the CD-α, a semiconductor laser with a wavelength of 0.685 or 0.680 $\mu$m and an objective lens having 0.55 numerical aperture are employed and track pitch TP is set to 1.0 $\mu$m. When the wavelength of the semiconductor laser is 0.685 $\mu$m, $\lambda$/NA is 1.245 and TP/($\lambda$/NA) is 0.80. When the wavelength of the semiconductor laser is 0.670 $\mu$m, $\lambda$/NA is 1.218 and TP/($\lambda$/NA) is 0.82.

For the reproduction from the DVD, a semiconductor laser with a wavelength of 0.635 or 0.650 $\mu$m and an objective lens having 0.60 numerical aperture are employed and track pitch TP is set to 0.74 $\mu$m. When the wavelength of the semiconductor laser is 0.635 $\mu$m, ?/NA is 1.058 and TP/($\lambda$/NA) is 0.6992. When the wavelength of the semiconductor laser is 0.650 $\mu$m, $\lambda$/NA is 1.083 and TP/($\lambda$/NA) is 0.683. The track pitch of the DVD is also shown in the table in 'Electronic Engineering' cited above.

On the other hand, for the reproduction from double density CD 5 according to the first embodiment of the present invention, semiconductor laser 1 with a wavelength of 0.780 $\mu$m (780 nm) and objective lens 4 having 0.52 numerical aperture are employed and track pitch TP of double density CD 5 is set to 1.1 $\mu$m. In this case, $\lambda$/NA is 1.50 and TP/($\lambda$/NA) is 0.73. As a way to make the recording density approximately double the recording density of the CD, to make the recording density in a running direction (tangential direction) $\sqrt{2}$ times that of the CD and to make the recording density in a transverse direction (radial direction) √2 times that of the CD can be conceivable. When the recording density in the tangential direction is increased to √2 times and the recording density in the radial direction to √1.8 times to increase the recording density nearly double that of the CD, track pitch TP becomes 1.193 (=1.6/√1.8) μm. In this case, to be strict, the recording density of double density CD 5 is 1.897 times (≅√2×√1.8) that of the CD. Therefore, in order to realize double density CD 5 having recording density of approximately double that of the CD, track pitch TP is desirably narrower than 1.193 μm, in other words, it is desirable that the expression TP<1.193 μm is satisfied. Thus, the expression TP/(λ/NA)<0.80 (≅1.193/1.5) is satisfied.

Figure 3:
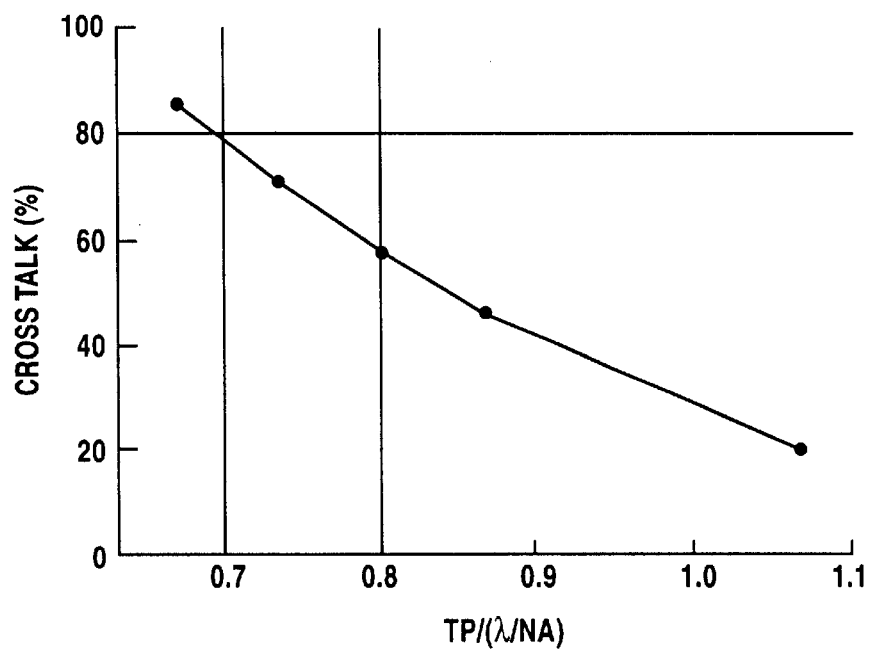
FIG. 3 is a graph showing the relation between crosstalk and $TP/(\lambda/NA)$ in the first embodiment of the present invention.

Shown in FIG. 3 is the relation between TP/(λ/NA) and crosstalk measured by semiconductor laser 1 with a wavelength of 0.780 μm and objective lens 4 with 0.52 numerical aperture. As the crosstalk represents the ratio of undesirable transfer of a signal of an adjacent track into a regular signal, the crosstalk becomes smaller as the value of TP/(λ/NA) increases. When the value of crosstalk exceeds 80%, jitter becomes large and a suitably reproduced signal cannot be obtained, hence it is desirable that 0.7<TP/(λ/NA).

Figure 4:
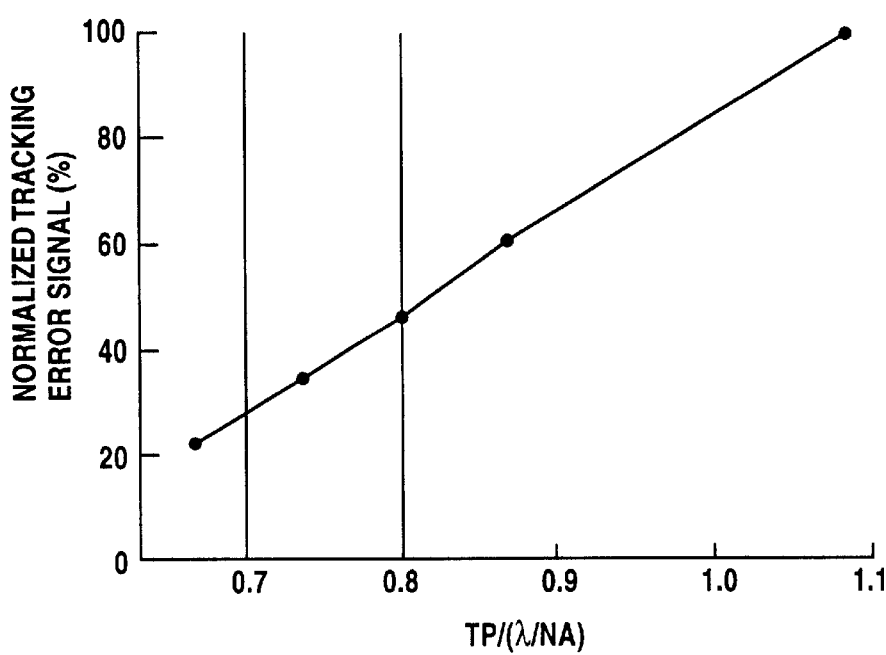
FIG. 4 is a graph showing the relation between a normalized tracking error signal and $TP/(\lambda/NA)$ in the first embodiment of the present invention.

The relation between the tracking error signal normalized based on the CD and TP/(λ/NA) is shown in FIG. 4. The tracking error signal is a well known control signal generated by photodetector 7 for the tracking servo control, and the normalized tracking error signal represents the level of a tracking error signal that can be obtained from double density CD 5 when the level of tracking error signal obtained from a CD with 1.5 μm track pitch is considered to be "1". When 0.7<TP/(λ/NA)<0.8 applies, the normalized tracking error signal falls within the range of 30% to 50%, and the tracking servo control can be performed with little effect from noise, provided that the tracking error signal obtained from the double density CD is amplified about two times larger. Therefore, such a double density CD 5 readily ensures compatibility with the CD.

As described above, for realizing double density CD 5 having a recording density twice that of the CD, the relation 0.7<TP/(λ/NA) is desirably established, where TP is track pitch, λ is wavelength of the semiconductor laser, and NA is numerical aperture of objective lens 4. As shown in Table 1 above, this relation does not apply but in the double density CD, hence, this relation is a particular condition for improving the reproduction characteristic of double density CD 5.

Figure 5:
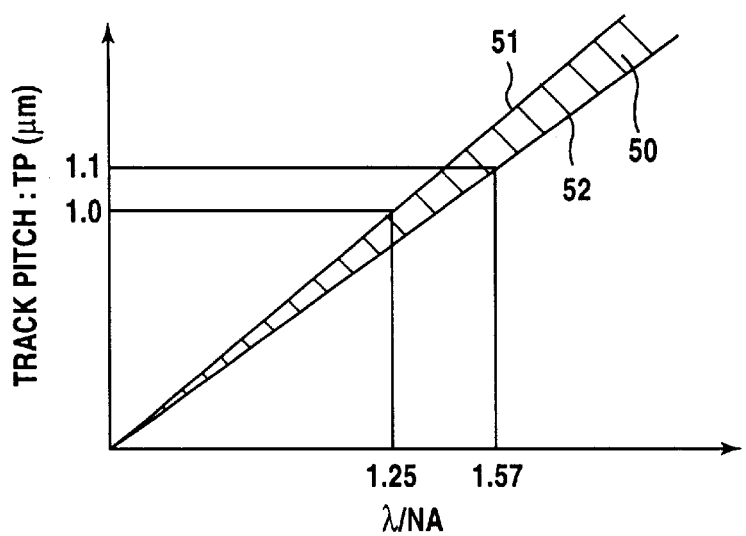
FIG. 5 is a graph showing the relation between TP and $\lambda/NA$ in the first embodiment of the present invention.

In FIG. 5, a straight line 51 representing TP/(λ/NA)=0.8 and a straight line 52 representing TP/(λ/NA)=0.7 are shown. A point defined by TP=1.0 μm and λ/NA=1.25 is on straight line 51. A point defined by TP=1.1 μm and λ/NA=1.57 is on straight line 52. Hence, by setting track pitch TP, wavelength λ of semiconductor laser 1, and numerical aperture NA of objective lens 4 to the values represented by points in a region 50 but not on straight lines 51 and 52, the reproduction characteristic of double density CD 5 can be optimized.

As can be seen from the foregoing, as double density CD 5 has a track pitch TP μm satisfying the expression 0.7<TP/(λ/NA)<0.8, crosstalk and jitter can be suppressed and the reproduction characteristic are improved in the first embodiment. In addition, as the tracking error signal of a sufficient level can be obtained, compatibility with CD is readily secured.

Second Embodiment

In the first embodiment, the point is to set track pitch TP to a desired value. In the second embodiment, instead of track pitch TP, the minimum pit length is set to a desired value.

Table 2 below shows wavelength λ of the semiconductor laser employed for reproduction from double density CD 5, numerical aperture NA of objective lens 4, λ/NA, minimum pit length L and L/(λ/NA). In Table 2, parameters employed for the CD, the LD, the MUSE-LD and the DVD are also shown for comparison beside the parameters described above employed for double density CD 5.

TABLE 2

| | Wavelength of semicondustor laser: λ (μm) | Numerical aperture of objective lens NA | λ/NA | Minimum pitlength: L (μm) | L/(λ/NA) |
|---|---|---|---|---|---|
| CD | 0.780 | 0.45 | 1.73 | 0.833 | 0.481 |
| LD | 0.780 | 0.50 | 1.56 | 0.543 | 0.348 |
| MUSE-LD | 0.670 | 0.55 | 1.218 | 0.486 | 0.399 |
| DVD | 0.635 | 0.60 | 1.058 | 0.4 | 0.378 |
| | 0.650 | 0.60 | 1.083 | 0.4 | 0.369 |
| Double density CD | 0.780 | 0.52 | 1.50 | 0.618 | 0.412 |

As shown in Table 2, for the reproduction from the CD, a semiconductor laser with a wavelength of 0.780 μm and an objective lens having 0.45 numerical aperture are employed and minimum pit length L is set to 0.833 μm. In this case, λ/NA is 1.73 and L/(λ/NA) is 0.481. In 'Electronic Engineering' cited above, the minimum pit length for CD is shown to be 0.834 μm.

For the reproduction from the LD, a semiconductor laser with a wavelength of 0.780 μm and an objective lens having 0.50 numerical aperture are employed and minimum pit length L is set to 0.543 μm. In this case, λ/NA is 1.56 and L/(λ/NA) is 0.348.

For the reproduction from the MUSE-LD, a semiconductor laser with a wavelength of 0.670 μm and an objective lens having 0.55 numerical aperture are employed and minimum pit length L is set to 0.486 μm. In this case, λ/NA is 1.218 and L/(λ/NA) is 0.399.

For the reproduction from the DVD, a semiconductor laser with a wavelength of 0.635 or 0.650 μm and an objective lens having 0.60 numerical aperture are employed and minimum pit length L is set to 0.4 μm. When the wavelength of the semiconductor laser is 0.635 μm, NA is 1.058 and L/(λ/NA) is 0.378. When the wavelength of the semiconductor laser is 0.650 μm, λ/NA is 1.083 and L/(λ/NA) is 0.369. In 'Electronic Engineering' cited above, the minimum pit length of DVD is shown to be 0.400 μm.

On the other hand, in the reproduction from double density CD 5, semiconductor laser 1 with a wavelength of 0.780 μm (780 nm) and objective lens 4 having 0.52 numerical aperture are employed and minimum pit length is set to 0.618 μm. In this case, λ/NA is 1.50 and L/(λ/NA) is 0.412.

A linear speed in reproduction from CD is 1.2 to 1.4 m/s. Next, consider the minimum pit length L of double density CD 5 at a linear speed of 1.3 m/s as a reference speed. As the minimum pit length of the CD is about 0.9 μm when the linear speed is 1.3 m/s, in order to increase the recording density in the radial direction to √2 times that of the CD and to increase the recording density in the tangential direction to √1.8 times that of the CD, the minimum pit length of double density CD 5 will be 0.673 (≅/√1.8) μm. Hence, to obtain double density CD 5 having a recording density of about twice that of the CD, desirably L/(λ/NA)<0.45 (≅0.673/1.5).

Figure 6:
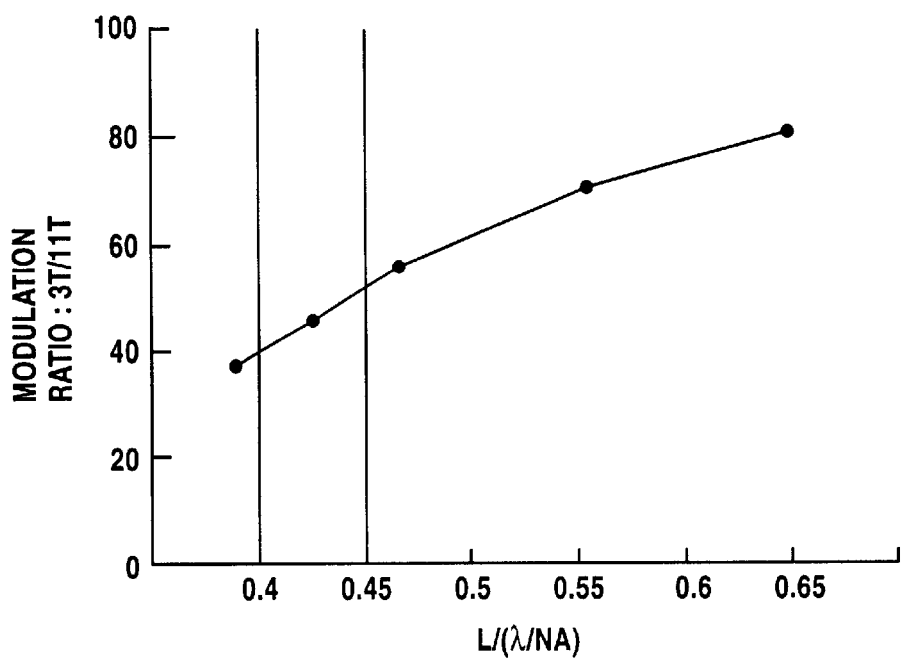
FIG. 6 is a graph showing the relation between modulation ratio and $L/(\lambda/NA)$ in the second embodiment of the present invention.

FIG. 6 shows the relation between modulation ratio of double density CD 5 and L/(λ/NA). Here, modulation ratio is a ratio of signal strength at maximum pit length (11T) to signal strength at minimum pit length (3T). As is clear from FIG. 6, provided that 0.40<L/(λ/NA)<0.45, modulation ratio is in the range of 40% to 50%.

Figure 7:
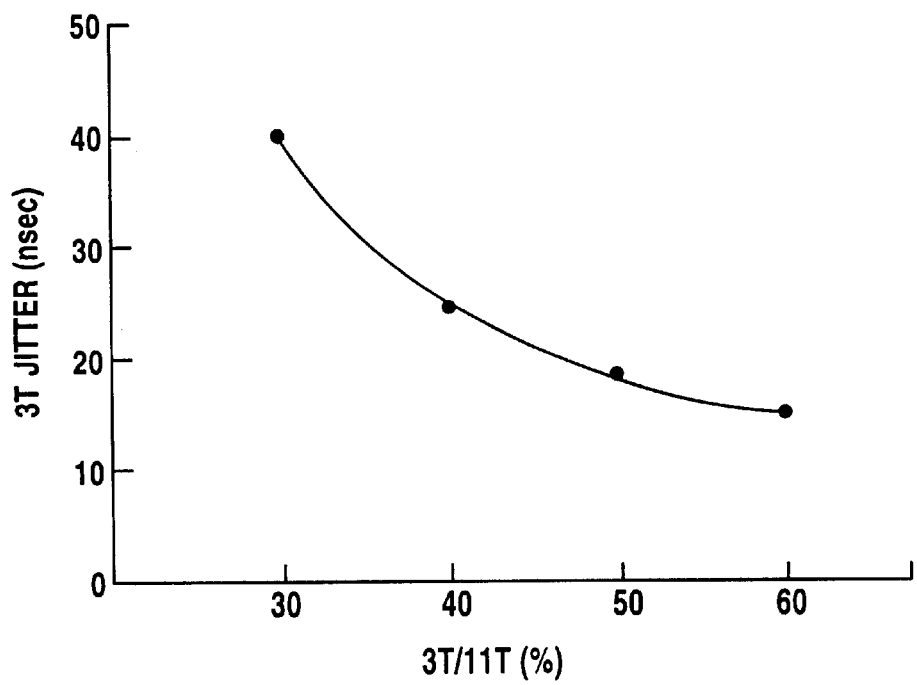
FIG. 7 is a graph showing the relation between jitter and modulation ratio in the second embodiment of the present invention.

FIG. 7 shows the relation between jitter and modulation ratio of signal at 3T. As can be seen from FIG. 7, when modulation ratio is about 40%, jitter at 3T is about 25 nanosecond. Generally, if jitter is smaller than about 30 nanosecond at the reproduction from the CD, the error rate will be at a practically nonsignificant level. In the construction of a drive apparatus, if 20% margin is provided in initial parameters to accommodate error in mechanism accuracy of an optical disk and an optical pickup device, practically applicable modulation ratio is desirably in the range exceeding 40%. As shown in FIG. 6, when the modulation ratio is larger than 40%, L/(λ/NA)>0.4. As the upper limit of L/(λ/NA) is 0.45 as described above, desirably 0.40<L/(λ/NA)<0.45 is satisfied.

Figure 8:
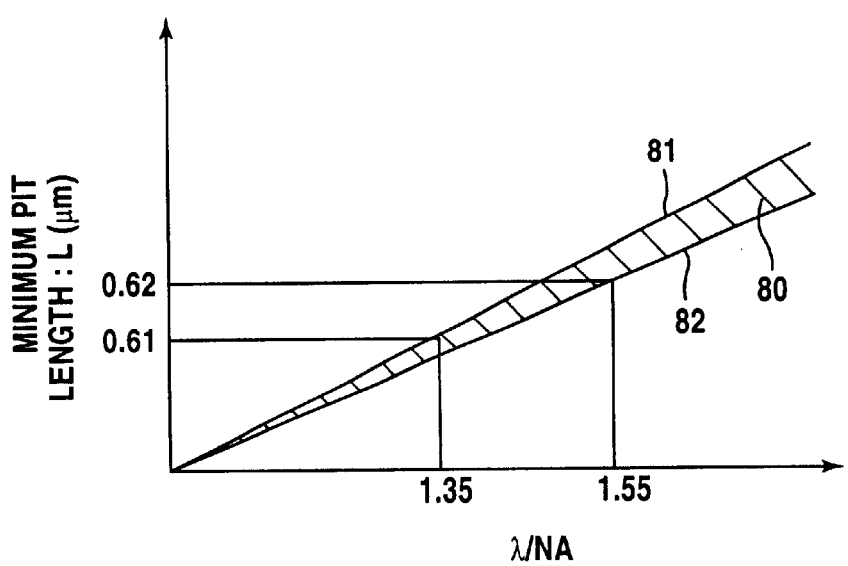
FIG. 8 is a graph showing the relation between L (minimum pit length) and $\lambda/NA$.

The condition for 0.40<L/(λ/NA)<0.45 described above is shown in FIG. 8. In FIG. 8, a straight line 81 representing L/(λ/NA)=0.45 and a straight line 82 representing L/(λ/NA)=0.40 are shown. A point defined by L (minimum pit length)=0.61 μm and λ/NA=1.35 is on straight line 81. A point defined by L (minimum pit length)=0.62 μm and λ/NA=1.15 is on straight line 82. In the second embodiment, minimum pit length L, wavelength λ of the semiconductor laser, and numerical aperture NA of objective lens 4 are set to desired values represented by points located in a region 80 but not on straight lines 81 and 82. Therefore the reproduction characteristic of double density CD 5 is improved.

Thus, according to the second embodiment, as double density CD 5 has a minimum pit length L μm satisfying the expression 0.40<L/(λ/NA)<0.45, jitter is suppressed and the reproduction characteristic is improved.

Third Embodiment

In the first embodiment, track pitch TP is set to a desired value and in the second embodiment, minimum pit length L is set to a desired value. In the third embodiment, both track pitch TP and minimum pit length L are set to desired values.

When semiconductor laser 1 with a wavelength of λμm and objective lens 4 having NA numerical aperture are employed, track pitch TP μm of double density CD 5 of the third embodiment satisfies the expression 0.7<TP/(λ/NA)<0.8 and minimum pitch length L μm satisfies the expression 0.40<L/(λ/NA)<0.45. In other words, when the track pitch of double density CD 5 is TP μm and the minimum pit length is L μm, and wavelength of semiconductor laser 1 is represented as λμm, the expression 0.7<TP/(λ/NA)<0.8 and the expression 0.40<L/(λ/NA)<0.45 are satisfied, where NA is the numerical aperture of objective lens 4.

Thus in the third embodiment, as the expression 0.7<TP/(λ/NA)<0.8 and the expression 0.40<L/(λ/NA)<0.45 are satisfied in double density CD 5, where TP is track pitch in μm and L is minimum pit length in μm, crosstalk and jitter are reduced, and the reproduction characteristic is improved. In addition, as the tracking error signal of a sufficient level can be obtained, compatibility with CD can readily be secured.

The disclosed embodiments should be considered exemplary only and not limiting. The scope of the invention is limited not by the foregoing description but by the appended claims, and is intended to include all modification falling within the range of the claims and equivalent to the claims.

Industrial Applicability

The recording medium of the present invention is useful as an optical disk for karaoke and games, and as an optical disk for movies and audio applications.

What is claimed is:

1. A recording medium for an optical pickup device including a laser with a wavelength λ of 0.78 μm and an objective lens having a numerical aperture of NA, said medium having a recording density that is two times the recording density of a compact disk, and comprising tracks having a pitch of TP μm, satisfying an expression of $$0.7 < TP/(\lambda/NA) < 0.8$$

so as to obtain a tracking error signal that is 0.3–0.5 times the tracking error signal obtained from said compact disk.

2. An optical pickup device for a recording medium including tracks of a pitch of TP μm, said medium having a recording density that is two times the recording density of a compact disk, said device comprising, a laser with a wavelength λ of 0.78 μm, and an objective lens focusing a beam from said laser, having a numerical aperture of NA, and satisfying an expression of $$0.7 < TP/(\lambda/NA) < 0.8,$$

so that a tracking error signal that is 0.3–0.5 times the tracking error signal obtained from said compact disk is obtained.

3. A recording medium for an optical pickup device including a laser with a wavelength λ of 0.78 and an objective lens having a numerical aperture of NA, said medium having a recording density that is two times the recording density of a compact disk, and comprising tracks having a minimum pit length of L μm, satisfying an expression of $$0.40 < L/(\lambda/NA) < 0.45$$

so as to obtain a signal strength that is 0.4–0.5 times the signal strength obtained from a maximum pit length.

4. An optical pickup device for a recording medium including tracks having a minimum pit length L μm, said medium having a recording density that is two times the recording density of a compact disk, said device comprising, a laser with a wavelength λ of 0.78 μm, and an objective lens focusing a beam from said laser, having a numerical aperture of NA, and satisfying an expression of $$0.40 < L/(\lambda/NA) < 0.45$$

so as to obtain from said minimum pit length a signal strength that is 0.4–0.5 times the signal strength obtained from a maximum pit length.

* * * * *